United States Patent
Kwon et al.

(10) Patent No.: US 10,278,228 B2
(45) Date of Patent: Apr. 30, 2019

(54) METHOD FOR SETTING COMMUNICATION CHANNEL OF DEVICE, METHOD FOR SETTING COMMUNICATION CHANNEL BETWEEN A PLURALITY OF DEVICES, AND DEVICE

(71) Applicant: SAMSUNG ELECTRONICS CO., LTD., Suwon-si (KR)

(72) Inventors: Jae-un Kwon, Seoul (KR); Deok-nam Kim, Suwon-si (KR); Ho-jeen Jee, Yongin-si (KR); Seung-seop Shim, Anyang-si (KR); Soo-yong Lee, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 190 days.

(21) Appl. No.: 14/574,609

(22) Filed: Dec. 18, 2014

(65) Prior Publication Data

US 2015/0245285 A1 Aug. 27, 2015

(30) Foreign Application Priority Data

Feb. 27, 2014 (KR) .......................... 10-2014-0023327

(51) Int. Cl.
*H04W 4/00* (2018.01)
*H04W 76/19* (2018.01)
*H04W 72/04* (2009.01)
*H04W 8/00* (2009.01)
(Continued)

(52) U.S. Cl.
CPC ........... *H04W 76/19* (2018.02); *H04W 8/005* (2013.01); *H04W 72/0453* (2013.01); *H04W 76/14* (2018.02); *H04W 84/12* (2013.01)

(58) Field of Classification Search
None
See application file for complete search history.

(56) References Cited

U.S. PATENT DOCUMENTS

2006/0142004 A1* 6/2006 He ........................ H04W 48/16
455/434
2008/0102852 A1* 5/2008 Du ........................ H04W 48/20
455/453

(Continued)

FOREIGN PATENT DOCUMENTS

EP 2574134 A1 3/2013
KR 10-2013-0097357 A 9/2013

OTHER PUBLICATIONS

Communication dated Sep. 11, 2015, issued by the European Patent Office in counterpart European Patent Application No. 15150580.7.

(Continued)

*Primary Examiner* — Zewdu A Beyen
(74) *Attorney, Agent, or Firm* — Sughrue Mion, PLLC

(57) ABSTRACT

A method for setting a communication channel of a first device is provided. The method for setting the communication channel of the first device includes: communicating with an Access Point (AP) via a predetermined channel; and in response to a problem arising in communicating with the AP, alternating between an AP search mode to discover the AP and a standby mode to set the communication channel for communicating with a second device among a plurality of channels.

14 Claims, 9 Drawing Sheets

(51) Int. Cl.
*H04W 76/14* (2018.01)
*H04W 84/12* (2009.01)

(56) References Cited

U.S. PATENT DOCUMENTS

| | | | |
|---|---|---|---|
| 2010/0097982 A1* | 4/2010 | Eichenberger | H04W 36/08 |
| | | | 370/328 |
| 2010/0303051 A1 | 12/2010 | Umeuchi et al. | |
| 2013/0223341 A1 | 8/2013 | Kim et al. | |
| 2013/0229930 A1* | 9/2013 | Akay | H04W 52/0245 |
| | | | 370/252 |
| 2014/0056209 A1* | 2/2014 | Park | H04W 88/04 |
| | | | 370/315 |
| 2014/0269646 A1* | 9/2014 | Ramasamy | H04W 76/023 |
| | | | 370/338 |

OTHER PUBLICATIONS

Communication dated Oct. 9, 2015, issued by the European Patent Office in counterpart European Patent Application No. 15150580.7.
"Wi-Fi Peer-to-Peer (P2P) Technical Specification", Wi-Fi Alliance Technical Committee, Dec. 14, 2011, vol. V1.2, pp. 1-159, United States, XP 008165048.
Communication issued by the Korean Intellectual Property Office dated Sep. 10, 2017 in counterpart Korean Patent Application No. 10-2014-0023327.

* cited by examiner

METHOD FOR SETTING COMMUNICATION CHANNEL OF DEVICE, METHOD FOR SETTING COMMUNICATION CHANNEL BETWEEN A PLURALITY OF DEVICES, AND DEVICE

CROSS-REFERENCE TO RELATED APPLICATION(S)

This application claims the benefit of a Korean patent application filed on Feb. 27, 2014 in the Korean Intellectual Property Office and assigned Serial No. 10-2014-0023327, the entire disclosure of which is hereby incorporated by reference.

BACKGROUND

1. Field

Apparatuses and methods consistent with exemplary embodiments relate to a method for setting a communication channel, and more particularly, to a method for setting a communication channel of a device, a method for effectively setting a communication channel between a plurality of devices, and a device.

2. Description of the Related Art

Miracast refers to a Wi-Fi standard technology for wirelessly streaming the entirety of the screen displayed on a mobile device such as a mobile phone, a notebook computer, etc., to another device.

Many devices may be connected to one another by using the Miracast technology. Devices, such as mobile devices, using a typical Wi-Fi function (e.g., Wi-Fi Direct) are connected to one another via a Peer to Peer (P2P) network. The Wi-Fi Direct function is a standard established based on IEEE 802.11 of Legacy Wi-Fi.

In the related art, there are various methods for Miracast devices to discover one another.

For example, according to a first method, when one device forms a P2P group and operates as a group owner, another device discovers the device which is the group owner by scanning.

According to a second method, Miracast devices alternate device searching and listening to discover one another. In this method, a device may be discovered by another device when the device is in a standby state (i.e., a listen state).

Typically, the second method is mainly used. However, when the device discovers another device using the second method while being connected to an access point (AP), a channel used by the AP and a channel used for searching and listening to another device are different. Thus, channel switching occurs, which may cause performance to deteriorate.

Therefore, there is a need for an effective method for a device connected to the AP to search for another device or to be discovered by another device while reducing the channel switching.

SUMMARY

One or more exemplary embodiments may overcome the above disadvantages and other disadvantages not described above. However, it is understood that the exemplary embodiments are not required to overcome the disadvantages described above, and an exemplary embodiment may not overcome any of the problems described above.

One or more exemplary embodiments provide an effective method for a device connected to an AP to search for another device or to be discovered by another device, while reducing channel switching.

According to an aspect of an exemplary embodiment, there is provided a method for setting a communication channel of a first device, the method including: communicating with an Access Point (AP) via a predetermined channel; and in response to a problem arising in communicating with the AP, alternating between an AP search mode to discover the AP and a standby mode to set the communication channel for communicating with a second device among a plurality of channels.

The problem may arise in communicating with the AP in response to communication with the AP via the predetermined channel being disconnected or in response to the predetermined channel of the AP being changed.

The method may further include scanning, in a first scan of the AP search mode, only some channels of the plurality of channels before switching to the standby mode.

The method may further include scanning, in a second scan of the AP search mode, other channels of the plurality of channels which have not been scanned, after switching back to the AP search mode from the standby mode.

The method may further include scanning, in the AP search mode, the predetermined channel before scanning other channels of the plurality of channels.

The method may further include scanning, in scans of the AP search mode, the predetermined channel at a higher frequency than other channels of the plurality of channels.

The method may further include randomly scanning, in the AP search mode, the plurality of channels.

The method may further include listening, in the standby mode, for a probe request packet transmitted from the second device via the predetermined channel.

The method may further include listening, in the standby mode, for a probe request packet transmitted from the second device via a social channel of the plurality of channels.

According to an aspect of another exemplary embodiment, there is provided a method for setting a communication channel of a second device, the method including: scanning all channels of a first device to set the communication channel for communicating with the first device; and listening for a scan signal of another device, wherein the scanning and the listening are performed alternately.

The scanning all channels may include transmitting a probe request packet via all channels of the first device.

The method may further include, in response to a probe response packet being received from the first device, setting the communication channel between the first device and the second device.

The scanning all channels may include scanning all channels of the first device according to an IEEE 801.11 transmission specification.

In response to a problem arising in communicating with an AP connected to the first device via a predetermined channel, the first device may alternate between an AP search mode to discover the AP and a standby mode to set a communication channel for communicating with the second device.

In response to the communication channel with the AP being set, the first device may enter a standby mode to communicate with the second device via the set communication channel.

According to an aspect of still another exemplary embodiment, there is provided a method for setting a communication channel between a plurality of devices, the method including: communicating, by a first device, with an AP via a predetermined channel; in response to a problem arising in communicating with the AP, alternating, by the first device, between an AP search mode to discover the AP and a first standby mode to listen for a scan signal of a second device; and alternating, by the second device, between a device scan mode to scan at least one channel of all channels of the first device to set a communication channel for communicating with the first device, and a second standby mode to listen for a scan signal of another device.

Only some channels of all channels may be scanned in the AP search mode.

The predetermined channel which is used for communicating with the AP may be scanned before other channels in the AP search mode.

According to an aspect of still another exemplary embodiment, there is provided a first device including: a communicator configured to communicate an Access Point (AP) via a predetermined channel; and a controller configured to, in response to a problem arising in communicating with the AP, alternate between an AP search mode to discover the AP and a standby mode to set a communication channel for communicating with a second device among a plurality of channels.

The first device may be a stationary device and the second device may be a mobile device.

According to an aspect of another exemplary embodiment, there is provided a method of a first device for determining a communication channel among a plurality of communication channels for communicating with a plurality of devices, the method including: scanning, in an access point (AP) search mode, the plurality of communication channels to determine the communication channel of the AP; connecting to the AP using the determined communication channel of the AP; listening, in a standby mode, for a probe request packet transmitted from a second device via the determined communication channel; and in response to receiving the probe request packet via the determined communication channel, transmitting a probe response packet to the second device via the determined communication channel.

In response to communication with the AP via the determined communication channel being disconnected or in response to the determined communication channel of the AP being changed, alternating between the AP search mode and the standby mode.

The method may further include scanning, in a first scan of the AP search mode, only some channels of the plurality of channels before switching to the standby mode; and scanning, in a second scan of the AP search mode, other channels of the plurality of channels which have not been scanned, after switching back to the AP search mode from the standby mode.

The method may further include listening, in the standby mode, for a probe request packet transmitted from the second device via the determined communication channel.

According to various exemplary embodiments described above, when the device is connected to the AP, the device can always wait for a connection with another device without degrading the connection performance with the AP, and thus can increase a channel setting speed.

BRIEF DESCRIPTION OF THE DRAWINGS

The above and/or other aspects will become more apparent by describing certain exemplary embodiments, with reference to the accompanying drawings, in which.

DETAILED DESCRIPTION OF EXEMPLARY EMBODIMENTS

Figure 1:
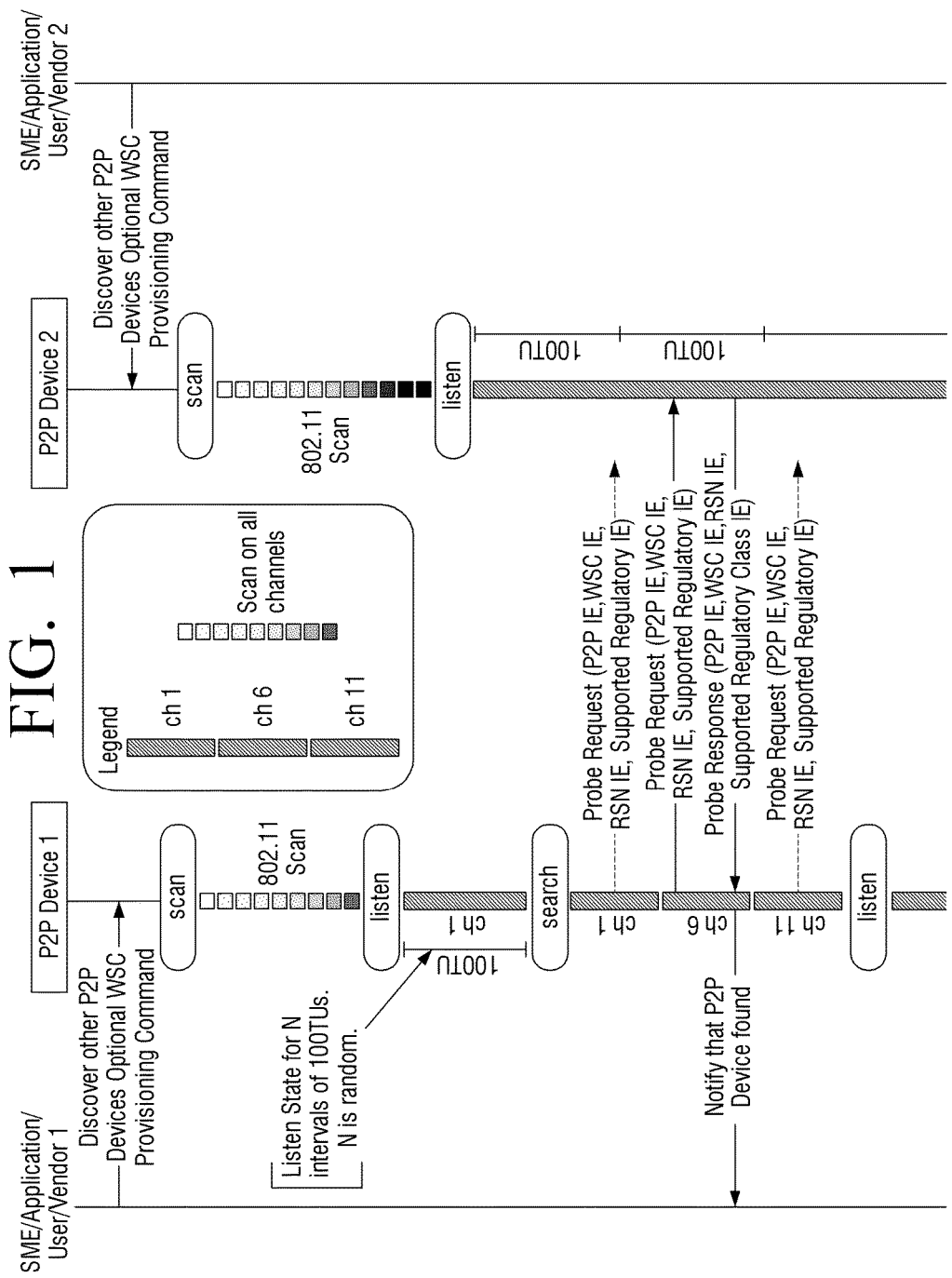
FIG. 1 is a sequence diagram of a method for setting a communication channel between devices according to an exemplary embodiment.

Hereinafter, certain exemplary embodiments will be described in greater detail with reference to the accompanying drawings.

In the following description, same reference numerals are used for the same elements, even when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a sequence diagram of a method for setting a communication channel between devices according to an exemplary embodiment.

Referring to FIG. 1, a device discovery process is performed to set a communication channel between devices. In a device scan mode, each of the devices (i.e., P2P Device 1 and P2P Device 2) scans each frequency channel. The scanning operation may be performed for a social channel or may be performed for all channels according to an IEEE 802.11 specification. Independent channels which do not have overlapping areas with neighboring channels are selected as social channels. For example, channel 1, channel 6, and channel 11 may be selected as social channels according to Miracast standards.

A device searching operation is performed after the scan phase. In this case, the device repeats a process of listening for a request of another device and a process of searching another device.

In a standby mode (i.e., a listen state), the device selects one channel from among the social channels, and waits for a probe request packet from another device for a time having a random value ranging from 100 time units (TU) to N*100TU and. According to the IEEE 802.11 specification, a unit of time (i.e., time unit) is equal to 1024 microseconds. In response to the probe request packet being received from another device, the device transmits a probe response packet.

In a search mode (i.e., a search state), the device transmits the probe request packet via each social channel (e.g., channels 1, 6, 11) and waits for the probe response packet.

Each device alternates between the search mode and the standby mode, and between transmitting the probe request packet and receiving the probe response packet, and thus are connected to another each other via a P2P network.

In order to connect to another device according to Wi-Fi Direct while connecting to an AP according to Wi-Fi Direct, the device (i.e., P2P device 1) should switch between a Wi-Fi station mode to communicate with the AP and a P2P mode (i.e., search mode and standby mode) to discover another device (e.g., PEP Device 2). When the channel used in the Wi-Fi station mode is not a social channel, a new channel should be assigned. In the related art, a device spends an additional time, as much as N*100TU, in the standby mode on channel switching. That is, when the device performs channel switching by alternating between the Wi-Fi station mode and the P2P mode, the device stays in the standby mode for as much as 100TU~N*100TU and thus performance is degraded proportional to the additional time.

Hereinafter, a method for setting a channel while minimizing such performance degradation will be explained. First, configurations of a first device 100 and a second device 200 will be explained.

Figure 2:
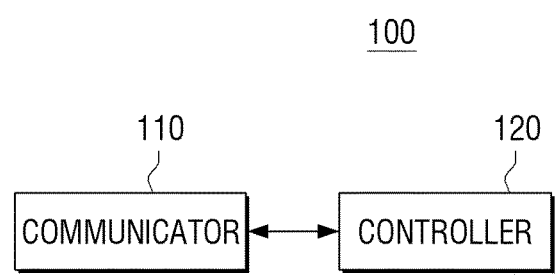
FIG. 2 is a block diagram illustrating a configuration of a first device according to an exemplary embodiment.
Figure 3:
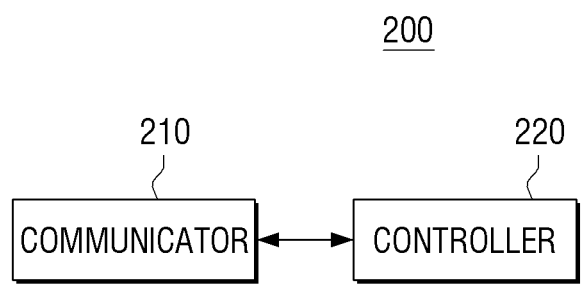
FIG. 3 is a block diagram illustrating a configuration of a second device according to an exemplary embodiment.

FIG. 2 is a block diagram illustrating a configuration of a first device 100 according to an exemplary embodiment, and FIG. 3 is a block diagram illustrating a configuration of a second device 200 according to an exemplary embodiment.

Referring to FIG. 2, the first device 100 according to an exemplary embodiment includes a communicator 110 and a controller 120.

The communicator 110 is an element for communicating with another device in a wired or wireless manner.

According to an exemplary embodiment, the communicator 110 may communicate with an AP 300 according to the IEEE 802.11 specification. The IEEE 802.11 specification is a technology which is used in a computer wireless network for a short-range communication network, which is called a wireless Local Area Network (LAN) or Wi-Fi. The first device 100 transmits a probe request frame. After transmitting the probe request frame, the first device 100 waits for a predetermined time for a probe response packet. A maximum response time during which the first device 100 waits may be defined by MinChannelTime(MinCT). In response to no response being received within the MinCT time, the first device 100 determines that a corresponding channel is empty and changes channel setting.

The AP 300 transmits a probe response frame in response to the probe request frame being received. A time to restrict the transmission is recorded on the frames. By restricting the time to transmit, the protocol can solve a hidden terminal problem. In this method, the communicator 110 is connected to the AP 300 and exchanges data with the AP 300.

In addition, the communicator 110 supports a P2P connection with another device. The communicator 110 may scan for another device. However, the communicator 110 may selectively transmit the probe request packet to only some of the channels unlike scanning all channels according to IEEE 802.11.

In the case of the P2P connection, two devices can be connected to each other via any channel and thus the two devices separately proceed with the scanning process (or search). To achieve this, in response to a certain device searching and transmitting a probe request packet, another device should listen to receive the probe request packet. Therefore, each device alternates between a search operation and a listen operation. A device search mode refers to a mode in which a device transmits a probe request packet to another device via some channel, a device scan mode refers to a mode in which a device transmits a probe request packet to another device via all channels, and a standby mode refers to a mode in which a device listens to receive a probe request packet transmitted from another device. In addition, an AP search mode is defined as a mode for searching for an AP separately from the device search mode or scan mode. In the above-described exemplary embodiment, the device may be set to alternate between the device search mode and the standby mode. The P2P technology may be implemented by using Wi-Fi Direct.

The controller 120 controls an overall operation of the first device 100. In particular, the controller 120 sets the device search mode, the device scan mode, the standby mode, and the AP search mode, thereby controlling the communicator 110 to exchange packets with an external device. The operation of the controller 120 according to various exemplary embodiments will be explained below in detail.

The controller 120 includes a hardware element such as a Micro Processing Unit (MPU) or a Central Processing Unit (CPU), a cache memory, a data bus, etc., and a software element such as an operating system and an application for performing a specific function. A control command regarding each element for operating the first device 100 is read out from the memory according to a system clock and an electric signal is generated according to the read-out command and operates each element of the hardware.

The above-described first device 100 may be implemented by using various products. In particular, the first device 100 may be implemented by using various stationary devices or mobile devices.

For example, the first device 100 may be implemented by using at least one of a digital TV, a smartphone, a tablet PC, a smart watch, smart glasses, a Portable Multimedia Player (PMP), an MP3 player, a Personal Digital Assistant (PDA), a cellular phone, a laptop computer, and other electronic devices. In addition, the first device 100 may be implemented by using various home appliances such as a refrigerator, a home automation system, etc.

Referring to FIG. 3, a second device 200 according to an exemplary embodiment includes a communicator 210 and a controller 220.

The communicator 210 of the second device 200 corresponds to the communicator 110 of the first device 100, and the controller 220 of the second device 200 corresponds to the controller 120 of the first device 100. Accordingly, they will not be described again in detail.

The second device 200 may be implemented by using various products. In particular, the second device 200 may be implemented by using various stationary devices or mobile devices.

For example, the second device 200 may be implemented by using at least one of a digital TV, a smartphone, a tablet PC, a smart watch, smart glasses, a Portable Multimedia Player (PMP), an MP3 player, a Personal Digital Assistant (PDA), a cellular phone, a laptop computer, and other electronic devices. In addition, the second device 100 may be implemented by using various home appliances such as a refrigerator, a home automation system, etc.

Figure 4:
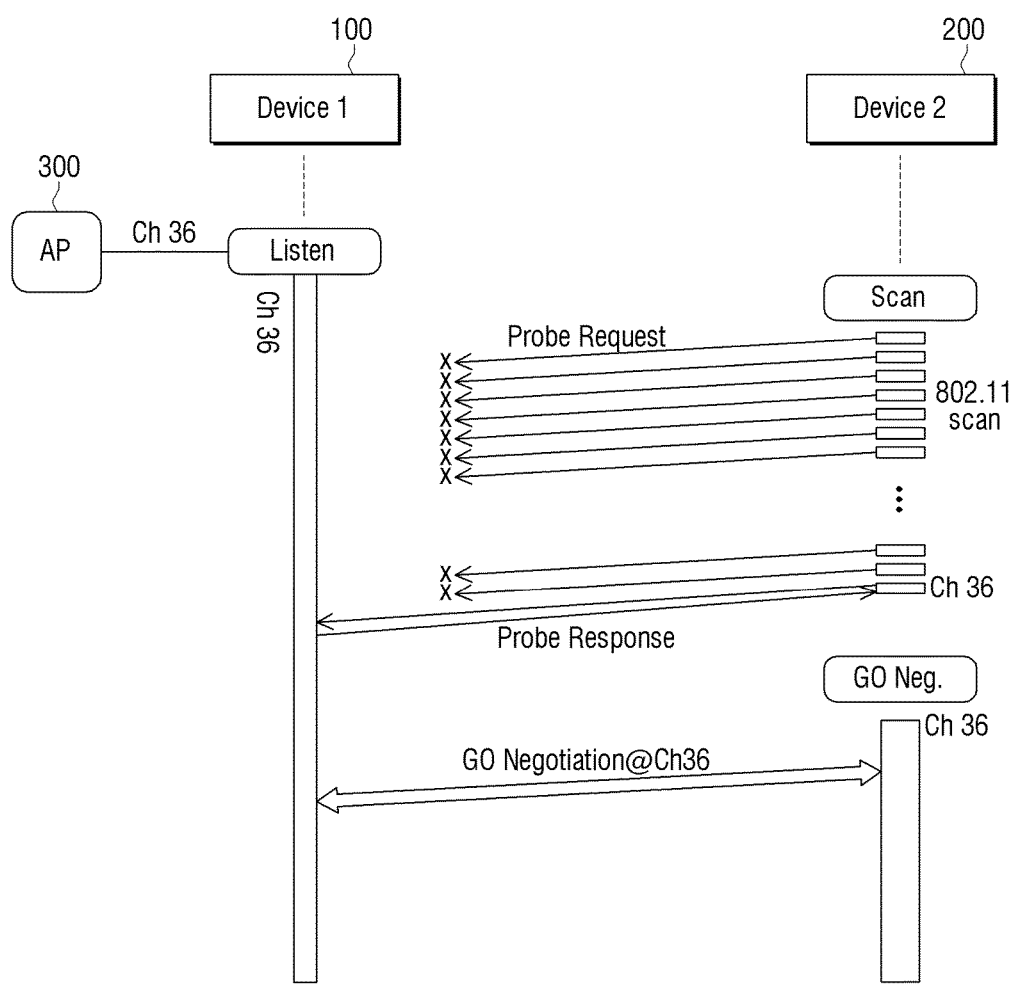
FIG. 4 is a sequence diagram illustrating a method for setting a communication channel between devices according to an exemplary embodiment.

FIG. 4 is a sequence diagram illustrating a method for setting a communication channel between devices according to an exemplary embodiment.

Initially, the first device 100 may set a communication channel with the AP 300 by transmitting a probe request packet to the AP 300 and receiving a probe response packet from the AP 300 as a response to the probe request packet.

Typically, since the AP 300 has a fixed channel (e.g., channel 36), the controller 120 of the first device 100 controls the communicator 110 to transmit the probe request packet via the fixed channel. However, when there are a plurality of APs or it is difficult to know channel information of the AP, the controller 110 controls to the communicator 120 to scan all channels. That is, the first device 100 transmits the probe request packet while setting channels one by one, and, in response to no response being received for a predetermined time after transmitting the probe request packet via a certain channel, the first device 100 changes the channel and transmits the probe request packet again. In the exemplary embodiment of FIG. 4, the first device 100 is finally connected to the AP 300 via channel 36.

Meanwhile, the first device 100 may require a P2P connection with another device, namely, the second device 200. For example, when the second device 200 is a mobile device, a game screen displayed on the second device 200 may be displayed on a TV, which is the first device 100. In this case, since the first device 100 has already set the channel, it is difficult for the first device 100 to change the channel and try to connect to another device.

In this case, the first device 100 may set a standby state to receive a packet from the second device 200. As shown in FIG. 4, the first device 100 listens to channel 36 which is used in the AP 300 connected thereto. Typically, since it is difficult for the second device 200 to know the set channel of the AP 300 in advance, the second device 200 transmits a probe request packet to all channels. In response to the probe request packet being received from the second device 200 via the channel connected to the AP 300, the first device 100 transmits a probe response packet.

In response to the probe response packet being received, the second device 200 transmits a GO negotiation request packet to request a connection with the first device 100, and the first device 100 transmits a GO negotiation response to the GO negotiation request packet, so that a GO negotiation is accomplished between the first device 100 and the second device 200 (i.e., the channel is set).

After the channel is set, a new channel for transmitting data is set between both devices, and data is transmitted via the set channel.

On the other hand, the second device 200 may alternate between a device scan mode and a standby mode. This is because the first device 100 may perform a device scan and a device other than the first device 100 may perform a device scan.

Figure 5:
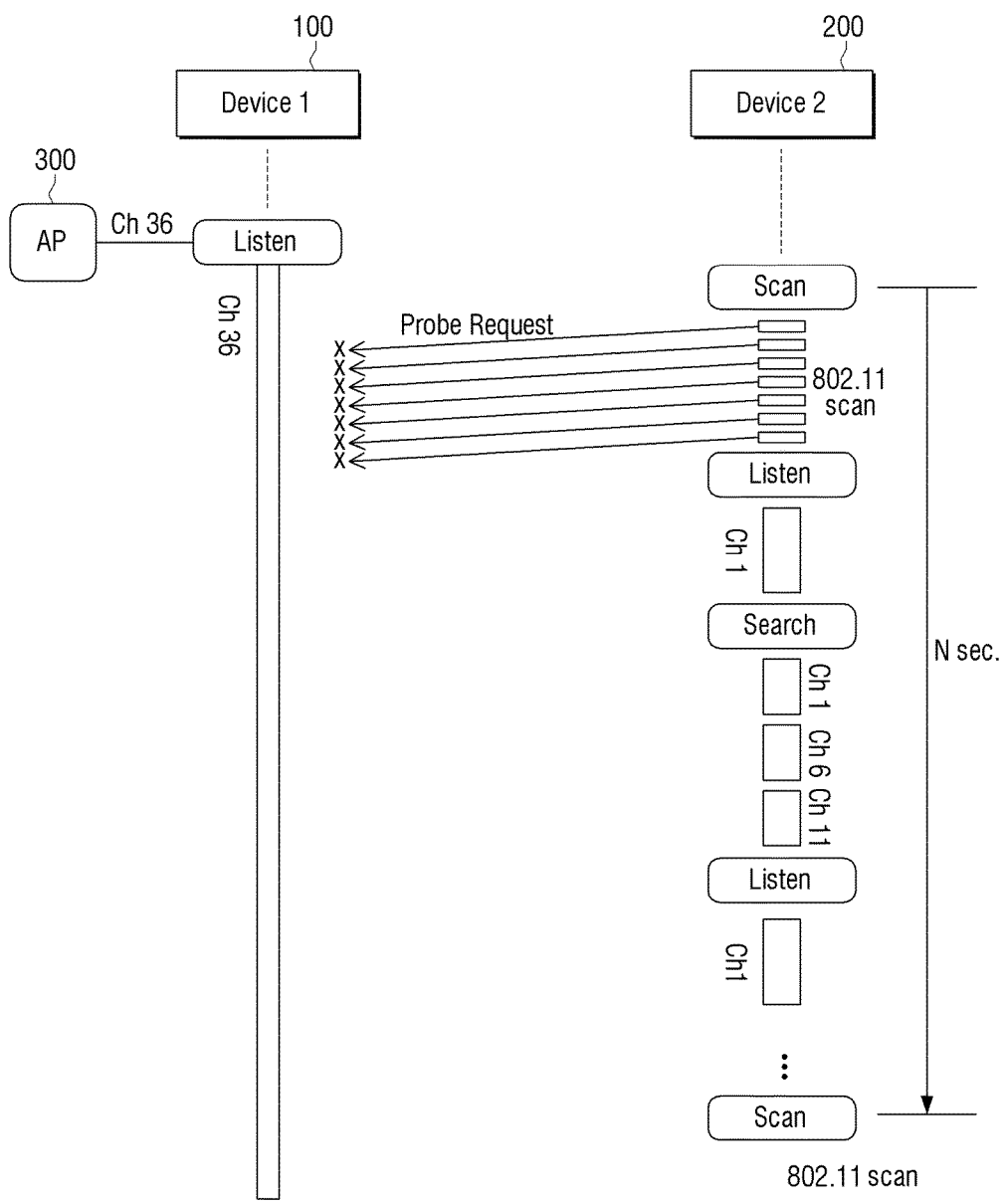
FIG. 5 is a sequence diagram illustrating a method for setting a communication channel between devices according to another exemplary embodiment.

FIG. 5 is a sequence diagram illustrating a method for setting a communication channel between devices according to another exemplary embodiment.

In the exemplary embodiment of FIG. 4, the second device 200 may scan all channels but may not discover the first device 100. In this case, when the second device 200 transmits the probe request packet to all channels again to search for the first device, there is a problem in that much time is required to set the channel.

Therefore, as shown in FIG. 5, the second device 200 may scan all channels during a first scan and then may transmit the probe request packet only to some channels while alternating between the device search mode and the standby mode. However, if a channel is not set within a predetermined time, the second device 200 may scan all channels again.

The device search may be performed only via some channels. For example, the device search may be performed via social channels. For example, channel 1, channel 6, and channel 11 may be selected as the social channels in the Miracast standard.

Listening for the probe response in the standby mode may be performed only via a specific channel. For example, the listening may be performed only via channel 1, as shown in FIG. 5. In response to the probe response packet being received, the second device 200 transmits a GO negotiation request packet and the first device 100 transmits a GO negotiation response to this request, so that a GO negotiation is accomplished between the two devices (i.e., a channel is set).

The above-described method reduces the operation of scanning all channels and thus can reduce the time required to set the channel.

Meanwhile, in response to a communication problem such as a disconnection from the AP 300 arising, the first device 100 should not only set the communication channel with the AP 300 but should also connect to the second device 200. Therefore, it is difficult for the first device 100 to know how to operate.

Figure 6:
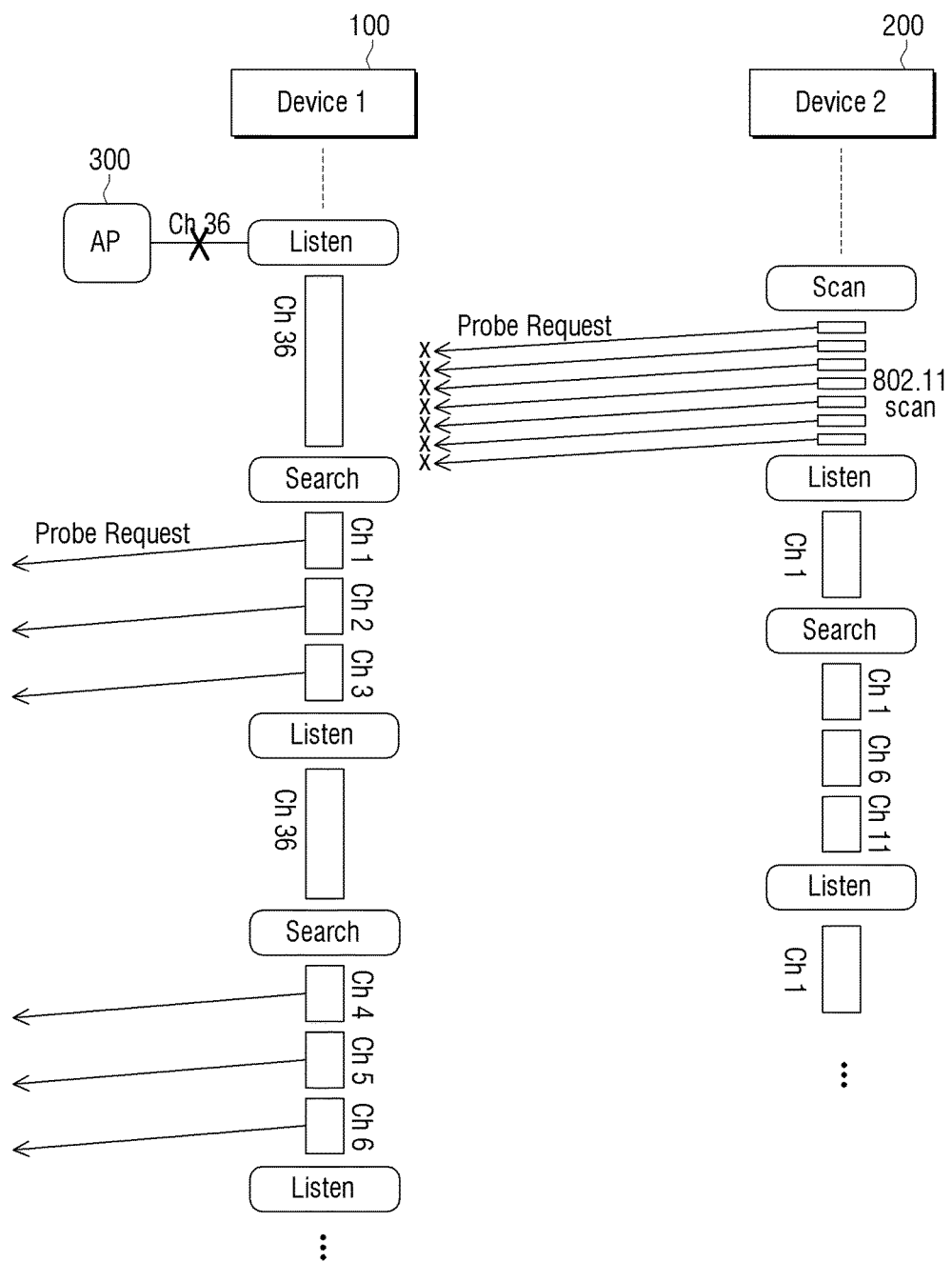
FIG. 6 is a sequence diagram illustrating a method for setting a communication channel between devices according to still another exemplary embodiment.

FIG. 6 is a sequence diagram illustrating a method for setting a communication channel between devices according to still another exemplary embodiment.

Referring to FIG. 6, in response to a communication problem arising with respect to the AP 300, the controller 120 of the first device 100 may alternate between the AP search mode to discover the AP 300 and the standby mode to set a communication channel with the second device 200.

Herein, the communication problem may arise with respect to the AP 300 when the first device 100 is disconnected from the AP 300, such as in the case in which the AP 300 is turned on later than the first device 100 connected to the AP 300, or when the channel of the AP 300 is changed.

The first device 100 should not only reconnect to the AP 300 first but should also set a connection with the second device 200. Therefore, the first device 100 searches for the AP 300 for a limited time according to the AP search mode to discover the AP 300. The first device 100 transmits a probe request packet for a predetermined time. The first device 100 scans only some channels in the AP search mode. Then, in a next AP search mode, the first device 100 scans the other channels which have not been scanned.

The first device 100 should transmit the probe request packet to all channels. However, if the first device 100 transmits the probe request packet to all channels in a same AP search mode, a large amount of time is required to perform channel switching. Therefore, the first device 100 does not have enough time to set a channel with the second device 200 and thus delays setting the channel with the second device 200. Accordingly, as set forth in the above-described method according to an exemplary embodiment, the first device 100 searches for the AP only via some channels, thereby reducing the time required to set the channel with the second device 200.

In this case, the first device 100 may scan some channels in sequence. For example, as shown in FIG. 6, the first device 100 may scan channels {1, 2, 3}, then scan channels {4, 5, 6}, then scan channels {7, 8, 9}, . . . . The number of channels scanned at a time may vary. As shown in FIG. 6, three channels may be scanned at a time, but other numbers of channels may be scanned at a time.

Alternatively, the channels may be scanned randomly. Furthermore, the channels may be scanned according to a predetermined algorithm.

In addition, the first device 100 may scan the predetermined channel which is used for communicating with the AP 300 in the AP search mode first. In addition, the first device 100 may give a weight value to some of the channels among all of the channels and may scan the weighted channel with higher frequency than the non-weighted channels. For example, the first device 100 may give a weight value to the channel which is used for communicating with the AP 300 and may scan the weighted channel with higher frequency than the non-weighted channels.

For example, when channel 36 has been connected to the AP, the first device 100 may scan the channels like {36, 1, 2}, {36, 3, 4}, {36, 5, 6}, {36, 7, 8}, . . . by giving a weight value to channel 36.

As described above, in response to the communication problem arising with respect to the AP 300, the controller 120 of the first device 100 may alternate between the AP search mode to discover the AP 300 and the standby mode to set the communication channel with the second device 200.

In the standby mode, the first device 100 may listen to a frequency of the second device 200 via the predetermined channel which is used for communicating with the AP 300.

For example, when channel 36 has been connected with the AP, the first device 100 may listen for the probe request packet by setting channel 36.

However, when there has been no connection with the AP 300, the first device 100 may listen for the probe request packet by using one of a certain channel and a social channel.

The second device 200 may first scan all channels and then may transmit the probe request packet only to some channels, while alternating between the device search mode and the standby mode. In the meantime, when a channel is not set within a predetermined time, the second device 200 may scan all channels again.

The device search may be performed only via some channels. For example, the device search may be performed via social channels. For example, channel 1, channel 6, and channel 11 may be selected as the social channels in the Miracast standard.

Listening for the probe response in the standby mode may be performed only via a specific channel. For example, the listening may be performed only via channel 1.

In response to the probe response packet being received, the second device 200 transmits a GO negotiation request packet and the second device 100 transmits a GO negotiation response to this request, so that a GO negotiation is accomplished between the two devices (i.e., a channel is set).

The above-described method reduces the operation of scanning all channels and thus can reduce the time required to set the channel.

Hereinafter, a method for setting a communication channel according to various exemplary embodiments will be explained.

Figure 7:
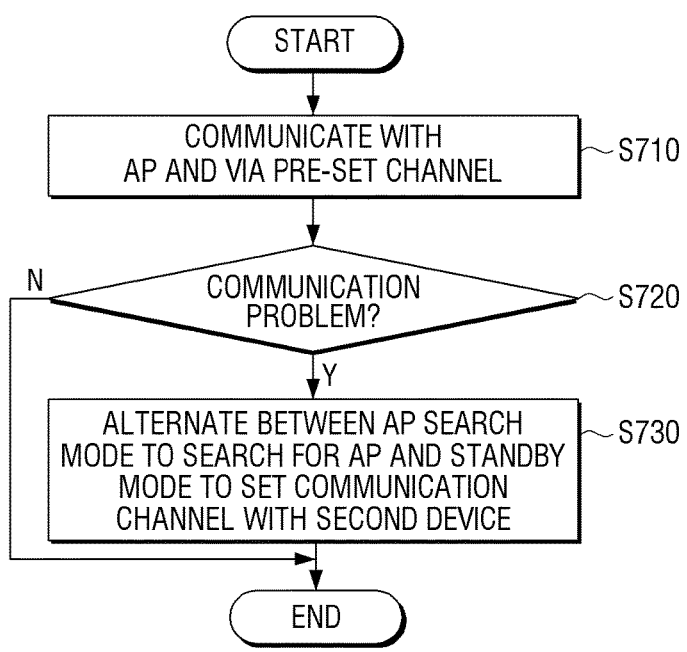
FIGS. 7 to 9 are flowcharts to illustrate a method for setting a communication channel according to various exemplary embodiments.
Figure 8:
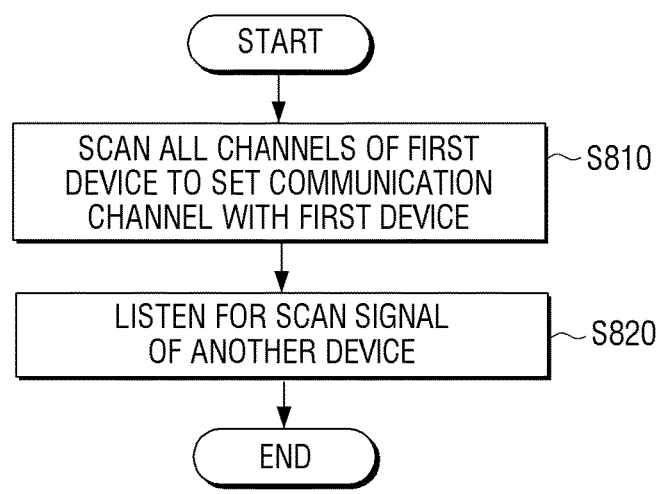
Figure 9:
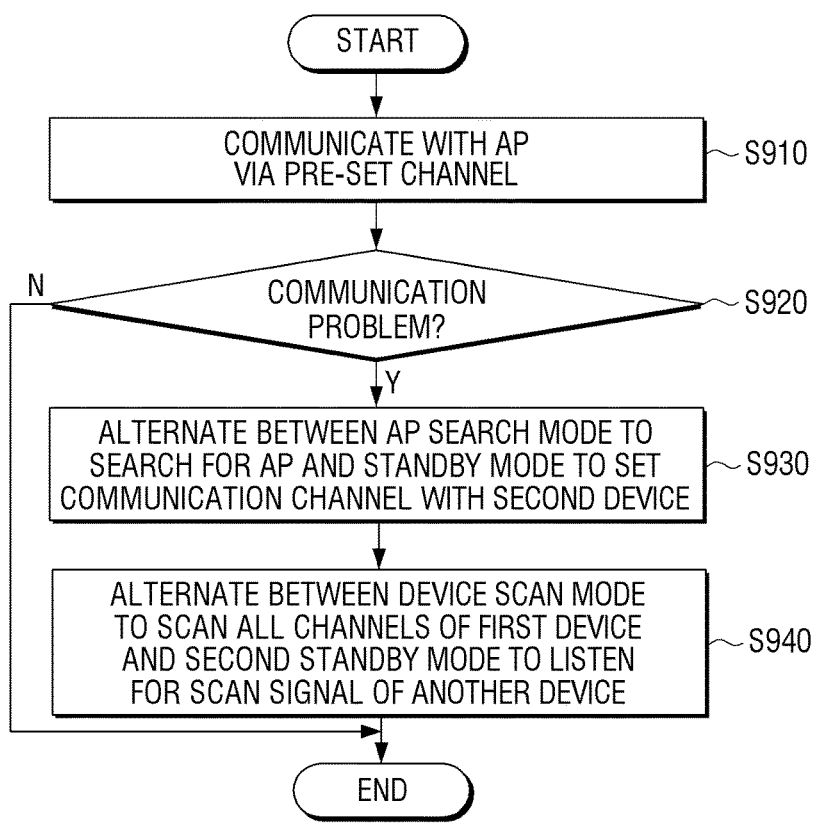

FIGS. 7 to 9 are flowcharts illustrating a method for setting a communication channel according to various exemplary embodiments.

Referring to FIG. 7, a method for setting a communication channel of a first device according to various exemplary embodiments includes: communicating with an AP via a predetermined channel (S710), and, in response to a problem arising in communicating with the AP (S720-Y), alternating between an AP search mode to discover the AP and a standby mode to set a communication channel with the second device (S730).

In this case, the problem may arise in communicating with the AP when a communication channel with the AP is disconnected or when a channel of the AP is changed.

The first device may scan only some channels among all channels in the AP search mode.

The first device may scan the other channels which have not been scanned in a next AP search mode of the AP search mode.

The first device may scan the predetermined channel which is used for communicating with the AP first in the AP search mode.

The first device may scan the predetermined channel which is used for communicating with the AP with higher frequency than other channels in the AP search mode.

The first device may scan all channels randomly in the AP search mode.

In the standby mode, the first device may listen to a frequency of the second device via the predetermined channel which is used for communicating with the AP.

In addition, in the standby mode, the first device may listen for a scan signal of the second device via a social channel.

Referring to FIG. 8, a method for setting a communication channel of a second device according to an exemplary embodiment includes: scanning all channels of the first device to set a communication channel with the first device (S810); and listening for a scan signal of another device (S820). The scanning and the listening may be performed alternately.

The scanning all channels (S810) may include transmitting a probe request signal via all channels of the first device.

The method may further include, in response to a probe response signal being received from the first device, setting a communication channel between the first device and the second device.

The scanning all channels may include scanning all channels of the first device according to an IEEE 801.11 transmission specification.

In response to a problem arising in communicating with an AP connected to the first device via a predetermined channel, the first device may alternate between an AP search mode to discover the AP and a standby mode to set a communication channel with the second device.

In addition, in response to the communication channel with the AP being set, the first device may enter a standby mode to communicate with the second device via the set communication channel.

Referring to FIG. 9, a method for setting a communication channel between a plurality of devices includes: communicating, by a first device, with an AP via a predetermined channel (S910); in response to a problem arising in communicating with the AP (S920-Y), alternating between an AP search mode to discover the AP and a first standby mode to listen for a scan signal of a second device (S930); and alternating, by the second device, between a device scan mode to scan all channels of the first device to set a communication channel with the first device, and a second standby mode to listen for a scan signal of another device (S940).

In addition, only some of the channels among all channels may be scanned in the AP search mode.

In addition, the predetermined channel which is used for communicating with the AP may be scanned first in the AP search mode.

According to various exemplary embodiments described above, when the device is connected to the AP, the device can always wait for a connection with another device without degrading the connection performance with the AP, and thus can increase a channel setting speed.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the present inventive concept, as defined by the appended claims, and many alternatives, modifications, and variations will be apparent to those skilled in the art.

What is claimed is:

1. A method for setting communication channels of a first device, the first device being connected to a Wi-Fi Access Point (AP) in an AP search mode, and connected to a second device by Wi-Fi Peer to Peer (P2P) in a standby mode, the method comprising:
communicating, by the first device, with the AP via a predetermined channel among channels for Wi-Fi communication in the first device; and
in response to a problem arising in communicating with the AP using the predetermined channel, switching alternately, by the first device, between the AP search mode in which the first device searches to discover the AP and the standby mode in which the first device listens in order to establish a Wi-Fi P2P communication with the second device,
wherein, in the standby mode of the first device, the first device listens, using the predetermined channel which is used for communicating with the AP before the problem arises, for a first probe request packet transmitted from the second device for the Wi-Fi P2P communication; and
wherein, in each AP search mode of the first device, the first device scans some of the channels in sequence by sending a second probe request packet using the some of the channels, and
wherein the some of the channels are less than an entire number of the channels in the first device.

2. The method of claim 1, wherein the problem arises in communicating with the AP in response to communication with the AP via the predetermined channel being disconnected or in response to the predetermined channel of the AP being changed.

3. The method of claim 1, wherein the first device scans the predetermined channel at a higher frequency than other channels of the entire number of the channels in the AP search mode.

4. The method of claim 1, wherein the first device scans the entire number of the channels randomly in the AP search mode.

5. The method of claim 1, wherein the second device sequentially cycles between a device scan mode to scan the entire number of the channels for the first device, a standby mode to listen for a scan signal of another device, and a search mode in which only some of the entire number of the channels are scanned in sequence by the second device.

6. The method of claim 5, further comprising, in response to a probe response packet being received at the second device from the first device, setting the communication channel between the first device and the second device.

7. The method of claim 5, wherein the scanning of the entire number of the channels by the second device comprises scanning the entire number of the channels of the first device according to an IEEE 802.11 transmission specification.

8. The method of claim 5, wherein, in response to the communication channel with the AP being set, the switching alternately, by the first device, between the AP search mode and the standby mode ceases and the first device enters the standby mode to listen for the first probe request packet transmitted from the second device.

9. A method for setting a communication channel between a plurality of devices, the method comprising:
communicating, by a first device, with an AP via a predetermined channel among channels for Wi-Fi communication in the first device;
in response to a problem arising in communicating with the AP, switching alternately, by the first device, between an AP search mode to discover the AP and a first standby mode to listen in order to establish a Wi-Fi P2P communication with a second device; and
switching alternately, by the second device, between a device search mode to scan at least one channel of an entire number of the channels of the first device to set a communication channel for communicating with the first device, and a second standby mode to listen for a search signal of another device,
wherein, in the first standby mode, the first device listens, using the predetermined channel which is used for communicating with the AP before the problem arises, for a first probe request packet transmitted from the second device for the Wi-pi P2P communication,
wherein, in each AP search mode of the first device, the first device scans some of the channels in sequence by sending probe request packets using the some of the channels, and
wherein the some of the channels are less than the entire number of the channels in the first device.

10. The method of claim 9, wherein the predetermined channel which is used for communicating with the AP is scanned before other channels in the AP search mode.

11. A first device comprising:
a communicator configured to communicate an Access Point (AP) via a predetermined channel among channels for Wi-Fi communication in the first device; and
a controller configured to, in response to a problem arising in communicating with the AP, switch alternately between an AP search mode to discover the AP and a standby mode to set a communication channel for communicating with a second device by Wi-Fi Peer to Peer (P2P) among the channels,
wherein, in the standby mode, the first device listens, using the predetermined channel which is used for communicating with the AP before the problem arises, for a first probe request packet transmitted from the second device for the communication with the second device by Wi-Fi P2P,
wherein, in each AP search mode, the first device scans some of the channels in sequence by the first device sending probe request packets using the some of the channels, and
wherein the some of the channels are less than an entire number of the channels in the first device.

12. The first device of claim 11, wherein the first device is a stationary device and the second device is a mobile device.

13. A method of a first device for determining a communication channel among communication channels for Wi-Fi communication in the first device for communicating with a plurality of devices, the method comprising:

scanning, in an access point (AP) search mode, the communication channels to determine the communication channel of the AP;
connecting to the AP using the determined communication channel of the AP; listening, in a standby mode, for a probe request packet transmitted from a second device via the determined communication channel; and
in response to receiving the probe request packet via the determined communication channel, transmitting a probe response packet to the second device via the determined communication channel,
wherein in response to communication with the AP via the determined communication channel being disconnected or in response to the determined communication channel of the AP being changed, switching alternately between the AP search mode and the standby mode, and wherein the standby mode is a mode to establish a Wi-Fi Peer to Peer (P2P) communication with the second device; scanning, in a first scan of the AP search mode, some channels of the communication channels before switching to the standby mode;
scanning, in a second scan of the AP search mode, other channels of the communication channels which have not been scanned, after switching back to the AP search mode from the standby mode, and
wherein the some of the channels are less than an entire number of the communication channels in the first device.

14. The method of claim 13, further comprising listening, in the standby mode, for a probe request packet transmitted from the second device via the determined communication channel.

\* \* \* \* \*